United States Patent [19]

Viertel et al.

[11] Patent Number: 5,160,203

[45] Date of Patent: Nov. 3, 1992

[54] MIRROR SUPPORT FOR A SUN VISOR FOR AUTOMOTIVE VEHICLES

[75] Inventors: Lothar Viertel, Altforweiler, Fed. Rep. of Germany; Patrick Welter, La Chambre, France

[73] Assignee: Gebr. Happich GmbH, Fed. Rep. of Germany

[21] Appl. No.: 721,963

[22] Filed: Jun. 27, 1991

[30] Foreign Application Priority Data

Jul. 21, 1990 [DE] Fed. Rep. of Germany ....... 4023243

[51] Int. Cl.$^5$ ............................................. F21V 33/00
[52] U.S. Cl. .................................... 362/141; 362/144; 296/97.5
[58] Field of Search ............... 362/135, 136, 144, 155, 362/137, 140, 141, 142; 296/97.5, 97.1, 97.8, 96.1, 96.5

[56] References Cited

U.S. PATENT DOCUMENTS

| | | | |
|---|---|---|---|
| 4,685,723 | 8/1987 | Canadas | 296/97.5 |
| 4,866,579 | 9/1989 | Miller et al. | 362/144 |
| 4,879,637 | 11/1989 | Clark et al. | 362/141 |
| 5,078,445 | 1/1992 | VandenBerge et al. | 296/97.1 |

FOREIGN PATENT DOCUMENTS

| | | |
|---|---|---|
| 3427952 | 1/1986 | Fed. Rep. of Germany . |
| 3707091 | 9/1987 | Fed. Rep. of Germany . |
| 2628797 | 9/1989 | France . |

*Primary Examiner*—James C. Yeung
*Attorney, Agent, or Firm*—Ostrolenk, Faber, Gerb & Soffen

[57] ABSTRACT

A sun visor for motor vehicles has a flat sun visor body of foam material which has a recess on one main surface to receive a trough which holds a mirror cassette. A frame, in which the trough is clipped is inserted into the recess. The frame has claws which can be swung to be anchored in the foam body at the recess sidewalls. A cover over the body is also held in the recess by the installed frame.

20 Claims, 2 Drawing Sheets

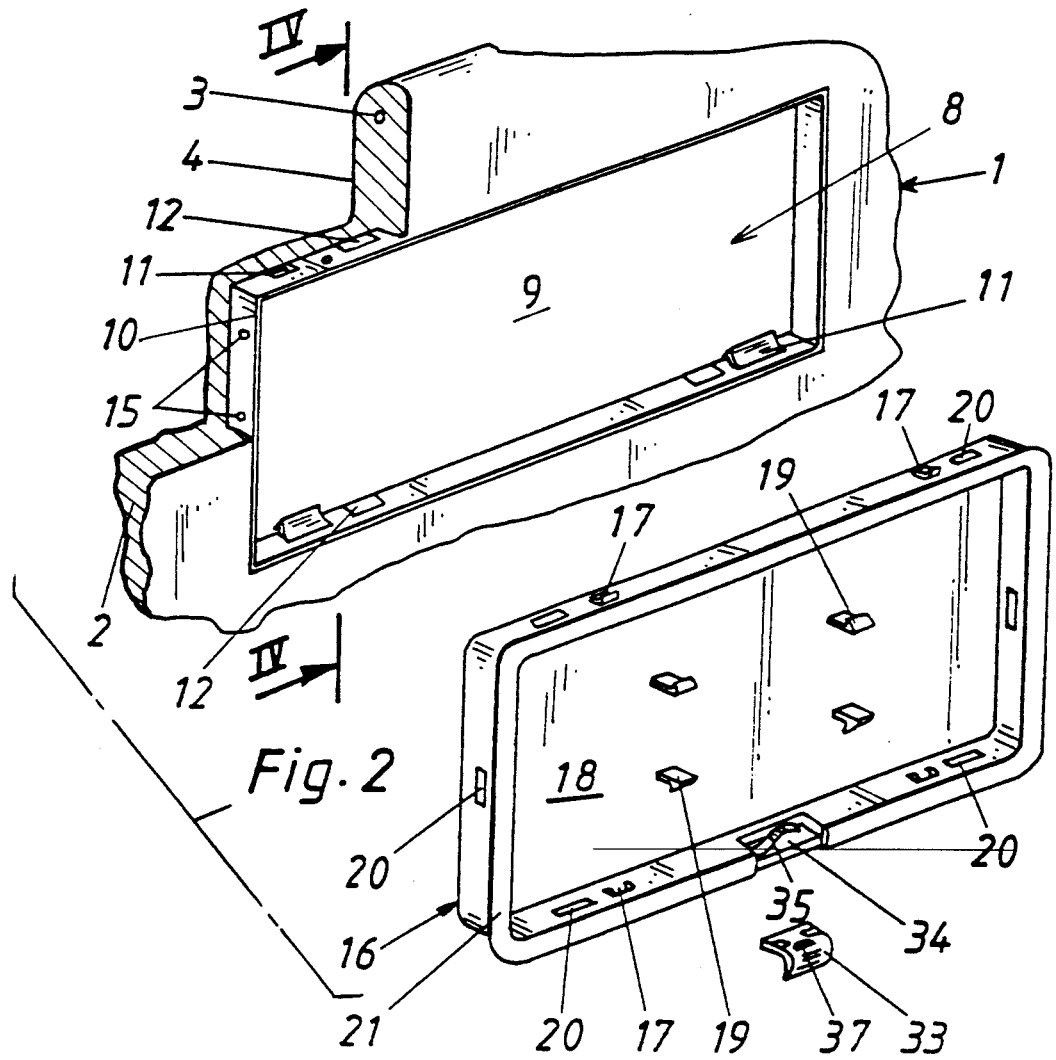

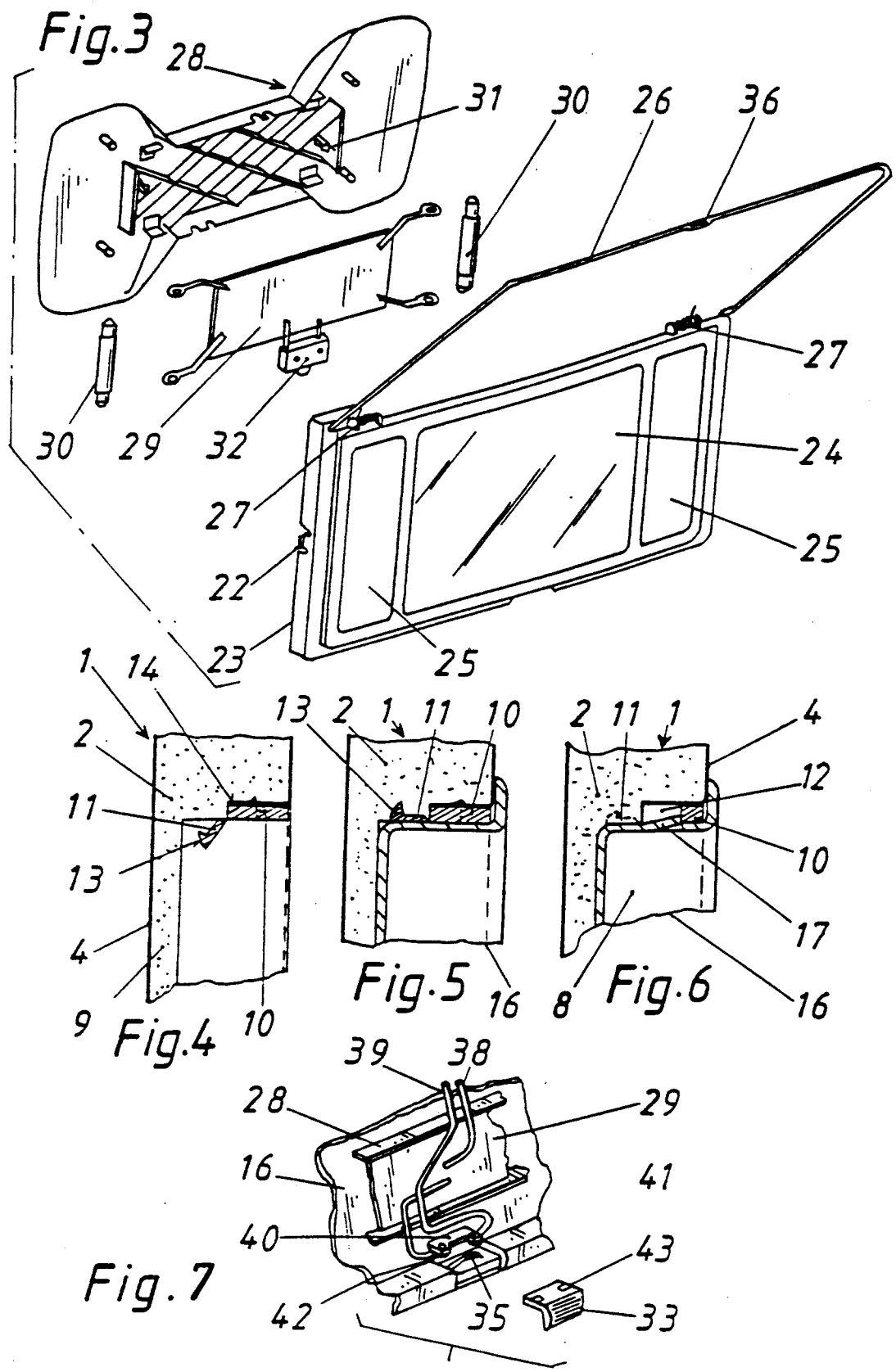

MIRROR SUPPORT FOR A SUN VISOR FOR AUTOMOTIVE VEHICLES

BACKGROUND OF THE INVENTION

The present invention relates to a vehicle sun visor and particularly to a mirror support in the sun visor. The body of the sun visor has a recess in one surface, and that recess has a trough that receives a mirror cassette The invention concerns securement of the trough in the recess and the mirror in the trough In the sun visor disclosed in Federal Republic of Germany Application OS 30 11 158, the bottom of a recess in the visor body comprises a thin layer of foam material to which the mirror holding trough is bonded by a heat sealing compound. Since modern sun visors are made thinner but are nevertheless equipped with mirror cassettes and also with electric lights, the layer thickness of the bottom of the recess is also becoming smaller. Therefore, there is no longer a reliable attachment of the trough under all circumstances, particularly as the heat sealing compound may come loose from the foam material. Furthermore, if the heat sealing compound is applied in separate spots, it may penetrate through the foam material. Upon hardening, the heat sealing compound may form hard places, which may become perceptible in a manner so that they can be felt or be seen. In addition, the application of the heat sealing compound and the insertion of the trough are time consuming, because it is necessary to wait until the heat sealing compound cools and solidifies before further mounting work can be carried out.

In another known sun visor, a base plate is incorporated in the body of the sun visor. The plate has a dome for attachment of the trough and of a lighting device. However, the base plate causes space to be lost, and mounting of the other elements is rather expensive and difficult due to the screwing in work which is necessary.

Other techniques of anchoring a mirror or a cassette that includes a mirror in a visor body are known from Federal Republic of Germany OS 34 27 952 and French Patent Publication 2,628,797. The state of the art is also found in Federal Republic of Germany Application OS 37 07 091. Simple sure securement of the mirror cassette in the visor body is not assured.

SUMMARY OF THE INVENTION

The object of the present invention is to simplify and improve the aforementioned sun visor with regard to the attachment of parts, and particularly the mirror on the sun visor body.

Another object is to secure the mirror in the visor body in the same step that installs or inserts the mirror there.

In order to achieve these objects, a frame to which the trough can be clipped has claws which can be anchored in the foam material, and the frame is used for fastening the trough into the recess. This avoids the previous requirement for using a heat sealing compound or attachment screws. It is merely necessary to introduce the frame into the recess and to then introduce the trough through the frame and into the recess. This causes the claws to be anchored in the foam material of the visor body. Application of the trough is therefore effected by an extremely rapid and simple insertion assembly. Immediately following that, other installation work can be performed, such as the application of a mirror cassette in the trough.

Easy insertion and dependable fixing of the frame on the sun visor body and of the trough on the frame are possible as well as attachment of the parts to be connected with the visor body, and particularly connection to the relatively thin layer of foam material at the bottom of the recess in the body.

Automatic anchoring of the claws and their reliable fastening in their anchored position in the foam material is obtained by merely inserting the trough into the recess.

Particularly simple and economical manufacture of the frame is a result of the invention.

The invention has the further advantage of reliably holding the cover material that is over the visor body, and particularly the edge region which adjoins the window opening in the cover, by clamping the material between the foam material and the frame. No gluing or prior pulling in of the edge region of the cover material is required. Gluing is superfluous due to the clamped attachment and because the pulling of the edge region into the recess is automatically effected by the insertion of the frame into the recess. There is also the possibility of clamping the edge region of the cover surrounding the window opening between the frame and the trough, which can hide the frame under the cover. In this case, the frame must be inserted into the recess before the sun visor body is provided with a cover.

The invention effects a clip attachment between the frame and the trough by the simplest means. The invention obtains simple mounting of the mirror cassette by insertion and provides a pleasing appearance to the sun visor.

In a sun visor with a mirror and a light, the sun visor can be made in a particularly simple and inexpensive manner, since all parts serving to fasten the mirror and the lighting means can be mounted by simple insertion.

Other features and advantages of the present invention will become apparent from the following description of the invention which refers to the accompanying drawings.

BRIEF DESCRIPTION OF THE DRAWINGS

FIG. 1 is a view of a sun visor with a mirror cassette, with its cover closed;

FIG. 2 is an exploded partial perspective view of the sun visor of FIG. 1;

FIG. 3 is another exploded partial perspective view of the sun visor of FIG. 1;

FIG. 4 is a section approximately along the line IV—IV of FIG. 2;

FIG. 5 is a section according to FIG. 4 with a trough inserted;

FIG. 6 is a section similar to FIG. 5, in the region of a trough attachment position, and FIG. 7 shows a detail of the sun visor.

DESCRIPTION OF A PREFERRED EMBODIMENT

The sun visor in which the invention is included comprises a sun visor body 1 having a core 2 of foam material. A reinforcement insert 3 of stiff wire is inserted in the core 2. A covering 4 of PVC sheeting or other fabric wraps over the core. For swingable hinged attachment of the visor to a vehicle body, there is a shaft 5 which is arranged for rotation in the sun visor body 1. A bracket 6 with vehicle body attachment holes in it is arranged swingably on the shaft 5. At the opposite end of the sun visor, there is an outer support pin 7 for detachable and rotatable suspension in an outer support bracket (not shown) on the body of the vehicle. The leg of the shaft 5 which is turnably mounted in the sun visor body 1 and the outer support pin 7 extend in alignment with each other along an upper edge region of the sun visor body 1. They form the axle for swinging the sun visor down against the windshield into the position of use or up to the position of rest in the region of the roof of the vehicle. The sun visor body 1 can also be swung toward a side window by detaching the outer support pin 7 from the outer support bracket and swinging the visor body against the side window around the leg of the shaft 5 mounted in the bracket 6.

There are electrical contacts 80 on the outer support pin 7 which cooperate with corresponding contacts (not shown) in the outer support bracket to supply electricity to lighting means Individual parts of those means are shown in FIGS. 2 and 7.

A stepped cross-section recess 8 is developed in the sun visor body 1. The lower or bottom region of the recess 8 adjacent the bottom 9 has a smaller cross section of its opening while the upper region toward the outside of the recess has a larger cross section. The upper region of the recess receives a frame 10. The frame is formed of a plastic injection molding. The frame has an approximately rectangular contour adapted to the shape of the recess 8, a plurality of claws 11, and a plurality of openings 12.

Claws 11 are preferably provided on two opposite sides of the frame. The claws are formed as one piece with the frame 10 via a film hinge and are of the same material as the frame. Each claw 11 comprises a swing arm which is formed on the lower or inner edge of the frame. It includes a barb 13 formed on its free swingable end. Upon insertion of the frame 10 into the recess 8, the edge regions 14 of the cover layer 4 over the visor body are at the same time pulled into the recess 8 and are clamped between the core 2 and the frame 10. In order to assure the attachment of the edge regions 14 of the cover 4, pins 15 having tapered ends are developed on the outside of the frame 10.

The openings 12 in the frame 10 receive clip noses 17 which are developed on the trough 16. The trough 16 is developed as a plastic injection molding having the obliquely outward protruding clip noses 17 which can move back resiliently into the corresponding plane of the wall. The trough has further clip noses 19 developed on and projecting up from the bottom 18 of the trough. The trough has openings 20 around its peripheral edge. It also has a surrounding laterally outwardly flaring front flange 21. To mount the trough 16, its bottom side is merely inserted through the frame 10 and into the recess. As it is pushed in, the sides of the trough 16 move against the claws 11 which move back resiliently and the barbs 13 of the claws engage in the foam material. As soon as the bottom 18 of the trough comes to rest against the bottom 9 of the recess 8, the clip noses 17 are also engaged in the respective openings 12, and the claws 11 are locked against moving back out of the foam material. The unit comprised of the frame 10 and the trough 16 is thus fixed reliably on the core 2 of the sun visor body 1 by a simple insertion mounting.

The openings 20 in the trough peripheral walls engage clip noses 22 which are developed on the mirror cassette 23. The cassette is also comprised of plastic. The mirror cassette can be fixed in the trough 6 by simple insertion. The mirror cassette 23 includes a mirror 24, two light transmitting windows 25 next to the mirror, and a hinged cover 26 over the mirror and the windows. The hinged cover 26 is hinged on the upper edge of the cassette and is held in open position by leg springs 27.

The sun visor also has a lighting device which is electrified by the electrical system of the vehicle. That device comprises a reflector 28, a circuit board 29 with contact elements, tubular bulbs 30, and the light windows 25. The reflector 28 can be clipped on the clip noses 19 on the bottom 18 of the trough by insertion mounting. The circuit board 29 can be clipped onto the reflector 28. For that purpose, the reflector is provided with clip noses 31.

For turning the lighting means on and off, a microswitch 32 (FIG. 3) is connected to the circuit board 29 or switch means (FIG. 7) are provided. In each case, an actuating switch 33 is provided which is seated in a swingable manner in a wall recess 34 in the trough 16. The switch 33 is acted on by a spring 35 which is also seated in the wall recess 34. The actuating switch 33 has two functions. On the one hand, it locks the cover 26 in position or unlocks it. For the first function, the actuating switch 33 has a detent nose 37 which can engage into a detent groove 36 on the cover. On the other hand, it controls the turning on and off of the lighting means.

When the cover 26 is open, the leg of the actuating switch 33 seated in the wall cutout 34 is acted on by the spring 35 so that it produces a switch contact on the microswitch 32 or a pressure on the circuit arrangement of FIG. 7. Upon unlocking of the cover 26, which is then moved upward by the leg spring 27, the microswitch 32 is therefore at the same time actuated by the actuation switch, or the circuit of the circuit arrangement of FIG. 7 is closed. FIG. 7 shows a region of the trough 16, a region of the reflector 28, and a region of the circuit board 29. Cables 38, 39 are connected to the circuit board. The cables terminate, on the one hand, directly and, on the other hand, indirectly in an insulator 40 with contacts 41, 42. In the upward position of the actuating switch 33 which is produced by the spring 35, a contact bridge 43 introduced therein assures that the circuit for the lighting means is closed. The cables 38, 39 are guided through the core 2 up to the contacts 8 on the outer support pin 7.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sun visor for an automotive vehicle comprising:
   a sun visor body having at least one generally flat external surface and comprised of foam material, the one surface being shaped to define a recess therein having sidewalls and having an open side on the one surface;
   a frame in and extending around the recess sidewalls;
   a trough in the frame for receiving a mirror and a mirror in the trough, the frame and the trough each having cooperating means for clipping the trough to the frame;
   claws on the frame which are shaped and positioned for being moved to be anchored in the foam material of the recess sidewalls, to thereby anchor the frame in the foam material of the visor body with the trough in the frame.

2. The sun visor of claim 1, further comprising a mirror cassette supporting the mirror, the mirror cassette being received in the trough.

3. The sun visor of claim 2, further comprising a circumferential flange around the mirror cassette on the open side of the recess, the circumferential flange extending outwardly over the visor body sufficiently to cover the frame around the trough and the cassette.

4. The sun visor of claim 1, wherein the recess has a part thereof toward the open side of the recess on the one surface of the body and the part of the recess has a stepped widening which defines a step shoulder facing outward of the recess, the frame being arranged in the stepped widening toward the open side of the recess and resting on the step shoulder of the recess.

5. The sun visor of claim 4, wherein the frame has an opening with a predetermined cross section and the trough has a respective peripheral contour generally corresponding to the cross section of the opening in the frame; and the frame fits into the recess.

6. The sun visor of claim 4, wherein the frame has an edge inward of the recess at the step shoulder and the claws are defined on that inward edge of the frame.

7. The sun visor of claim 6, wherein each claw comprises a swingable arm attached on the frame, and at least one barb defined on the arm spaced outward from its attachment to the frame, the claw arm being swingable from a position with the barb away from the sidewall of the recess and into an anchoring position in which the barb engages in the sidewall of the recess below the stepped widening of the recess.

8. The sun visor of claim 7, wherein the frame includes a wall facing the sidwall of the recess, each arm being swingable from a starting position generally directed toward the bottom of the recess with the barb away from the sidewall of the recess and into an anchoring position with the arm aligned approximately parallel to the wall of the frame.

9. The sun visor of claim 7, wherein the frame has an opening with a predetermined cross section and the trough has a respective peripheral contour generally corresponding to the cross section of the opening in the frame, and the frame fits into the recess;

the claws being mounted to the frame to be swingable into their anchoring position, and the claw arms being so positioned that insertion of the trough into the recess in which the frame is positioned engages the arms for moving the barbs into the sidwall of the recess, and the frame being shaped to lock the arms with the barbs in the sidewalls of the recess.

10. The sum visor of claim 9, wherein the claws are developed in one piece with the frame and there is a hinge between the claws and the frame.

11. The sun visor of claim 9, wherein the frame and the claws are developed as a plastic injection molding with each of the claws being developed in one piece with the frame and the hinge is a film hinge between the frame and the claws which is of the same material as the frame.

12. The sun visor of claim 1, further comprising a thin and flexible covering extending over the one surface of the visor body and into the recess, and the frame adapted for fastening regions of the covering in the recess.

13. The sun visor of claim 12, wherein the covering has an opening having a cross-section smaller than the cross-section of the recess and generally corresponding in shape thereto and the covering is drawn into the recess together with edge regions of the covering that adjoin the stamping.

14. The sun visor of claim 13, further comprising tapered pins defined on the sides of the frame outward thereof toward the wall of the recess and the pins engage the cover in the recess.

15. The sun visor of claim 1, wherein the cooperating means for clipping the trough to the frame comprises openings defined in the frame and clip noses formed on the trough and positioned for being received in the openings in the frame to thereby clip the trough in the frame.

16. The sun visor of claim 15, further comprising a mirror cassette supporting the mirror, the mirror cassette being received in the trough; and openings in the mirror cassette, which are placed for receiving the clip noses that are engaged in the openings of the frame.

17. The sun visor of claim 1, wherein each claw comprises a swingable arm attached on the frame, and at least one barb defined on the arm spaced outward from its attachment to the frame, the claw arm being swingable from a position with the barb away from the sidewall of the recess and into an anchoring position in which the barb engages in the sidewall of the recess below the stepped widening of the recess.

18. The sun visor of claim 17, wherein the frame has an opening with a predetermined cross section and the trough has a respective peripheral contour generally corresponding to the cross section of the opening in the frame, and the frame fits into the recess;

the claws being mounted to the frame to be swingable into their anchoring position, and the claw arms being so positioned that insertion of the trough into the recess in which the frame is positioned engages the arms for moving the bars into the sidewall of the recess, and the frame being shaped to lock the arms with the barbs in the sidewalls of the recess.

19. A sun visor for a vehicle comprising:

a sun visor body having at least one generally flat external surface and comprised of foam material and having a recess defined in the one surface;

a frame in and extending around the recess; claws on the frame, the claws being movable for anchoring the frame in the recess;

a trough in the frame, and a mirror cassette supported in the trough;

the frame having openings for clipping the trough in the frame with the frame in the recess, the trough having first clip noses which are engagable in the openings of the frame for holding the trough to the frame;

the trough having a bottom facing the bottom of the recess; second clip noses arranged on the trough bottom, a reflector in the trough supported on the second clip noses; the reflector having third clip noses, a circuit board held in the third clip noses, the circuit board having means for connecting the circuit board to a source of light and to a power source;

the trough having clip nose receiving openings defined therein, fourth clip noses formed on the mirror cassette for engagement in the trough openings;

a mirror supported on the mirror cassette; a light window in the mirror cassette and arranged over the light source for light from the source to shine through the light window, the light window being next to the mirror in the cassette; a cover movable over the mirror and the light window, a spring urging the cover in an open direction off the mirror and the light window;

an actuating switch for selectively locking the cover over the mirror and over the light window and for simultaneously disconnecting the light source from the power source and for selectively unlocking the cover for permitting the spring to urge the cover open and for simultaneously connecting the light source to the power source with the cover open.

20. The sun visor of claim 19, wherein the actuating switch for the cover is normally spring closed and is actuated to release the cover by operation overcoming the spring force.

* * * * *